United States Patent [19]

Haszeldine et al.

[11] 3,720,644

[45] March 13, 1973

[54] POLYSILOXANES CONTAINING FLUOROALKYLAMINOALKYL GROUPS

[75] Inventors: Robert Neville Haszeldine, Disley, Anthony Edgar Tipping, Bramhall, both of England

[73] Assignee: Minister of Aviation Supply in Her Britannic Majesty's Government of the United Kingdom of Great Britain and Northern Ireland, London, England

[22] Filed: Nov. 12, 1970

[21] Appl. No.: 89,081

[30] Foreign Application Priority Data

Nov. 12, 1969 Great Britain.....................55,381/69

[52] U.S. Cl. ...260/46.5 E, 260/46.5 G, 260/448.2 N
[51] Int. Cl. ...............................................C08f 11/04
[58] Field of Search.......260/46.5 E, 46.5 G, 448.2 N

[56] References Cited

UNITED STATES PATENTS 3,033,815    5/1962    Pike et al..............................260/46.5

Primary Examiner—Donald E. Czaja
Assistant Examiner—Melvyn I. Marquis
Attorney—Stevens, Davis, Miller & Mosher

[57] ABSTRACT

This specification describes polysilsesquioxanes of the general formula

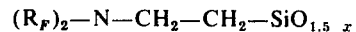

where $R_F$ is a fully fluorinated lower alkyl group and $x$ has the value of 20 to 50 and polysiloxanes of general formula

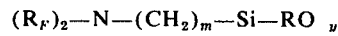

where $R_F$ is a fully fluorinated lower alkyl group, $m$ is two or three, R is lower alkyl group and $y$ has the value 3 to 16. The preparation of these polymers is also described.

6 Claims, No Drawings

POLYSILOXANES CONTAINING FLUOROALKYLAMINOALKYL GROUPS

The present invention is concerned with novel substituted silanes and with polysiloxanes which are obtained by hydrolysis and condensation of such silanes.

In accordance with the present invention there is provided a novel substituted silane of the formula:

$$(R_F)_2N-(CH_2)_m-SiR_{3-n}X_n \quad (I)$$

where $R_F$ is a fully fluorinated lower alkyl group, R is a lower alkyl group, X is a halogen, excluding fluorine, $m$ is two or three, and $n$ is two or three.

In the present specification the term lower alkyl group is used to mean a straight or branched chain alkyl group containing less than six carbon atoms.

In preferred silanes of the present invention $R_F$ is trifluoromethyl, R is methyl and X is chlorine.

The novel silanes of the present invention are readily obtained by free radical or catalyzed addition of an appropriate silane to a suitable olefin.

In accordance with one aspect of the present invention a process for the production of a silane having Formula (I) above includes the steps of reacting a silane having the formula:

$$SiHR_{3-n}X_n \quad (II)$$

wherein R, X and $n$ are as hereinbefore defined, and an olefin of the formula:

$$(R_F)_2N-(CH_2)_p-CH=CH_2 \quad (III)$$

wherein $R_F$ is as hereinbefore defined and $p$ is zero or one. The reaction may be carried out by heating, preferably in the presence of a catalyst such as hexachloroplatinic acid, in a sealed tube for a time of up to 60 hours at a temperature in the range 60° to 150°C. The time of reaction and temperature are interdependent, higher temperatures permitting shorter reaction times. Alternatively the reaction may be carried out under the influence of ultra-violet light and the photochemical reaction is conveniently carried out by sealing the reactants in a silica tube. The period of time for which irradiation is carried out depends upon the strength of the ultra-violet source and upon the amount of reactants taking part in the reaction.

The novel substituted silanes of Formula (I) are readily hydrolyzed and heating under reflux in wet ether has been found to convert the silanes of Formula (I) wherein X is halogen to the corresponding silanols, wherein X is OH. These silanols are not stable under these reaction conditions and undergo further reaction by condensation to polysiloxanes. This may be assisted by acids or bases.

In accordance with a feature of the present invention there is provided a polysilsesquioxane having the general formula:

$$\{(R_F)_2N-CH_2-CH_2-SiO_{1.5}\}_x \quad (IV)$$

wherein $R_F$ is as hereinbefore defined and $x$ is an integer and may have a value of 20 to 50 units.

In accordance with an aspect of the invention a process for the production of a polysilsesquioxane of Formula (IV) comprises subjecting a silane of Formula (I) above wherein X is Cl, $m$ is 2 and $n$ is 3 to a condensation reaction under the influence of acid or base. The particular polymer obtained is governed by the condensation conditions used. For example condensation under the influence of a 2:1 molar mixture of 2-ethylhexoic acid and 1,1,3,3,-tetramethyl guanidine results in a solid polysilsesquioxane in which x is 6 and which may be sublimed in vacuo, whereas condensation in the presence of aqueous hydrochloric acid in toluence solution followed by heat treatment of the crude polymer at 200°C leads to a liquid polysilsesquioxane wherein $x$ is greater than 20 and which is hydrolytically stable in the presence of acids and bases at temperatures up to at least about 160°C.

In accordance with a further feature of the present invention there is provided a polysiloxane having the general formula:

$$\{(R_F)_2N-(CH_2)_m-SiR-O-\}_y \quad (V)$$

wherein $R_F$, R, and $m$ are as hereinbefore defined and $y$ is three to sixteen and the product may be cyclic or linear.

In accordance with a further aspect of the invention a process for the production of a polysiloxane of Formula (V) as aforesaid comprises subjecting a silane of Formula (I) above wherein $R_F$, R and m are as hereinbefore defined and X is cl and $n$ is 2 to hydrolysis and condensation. The particular products obtained depend upon the conditions chosen. In particular trimers of Formula (V) wherein $y$ is 3 may be obtained and by further treatment may be converted to polysiloxanes of higher molecular weight.

In accordance with yet another aspect of the present invention a process for the production of a polysiloxane of Formula (V) comprises treating a cyclic trimer of Formula (V) wherein $y$ is three with an alkali metal hydroxide followed by heating at a temperature broadly in the region of 100° to 200°C.

Polysilsesquioxanes and polysiloxanes of the present invention have good thermal stability in vacuo, comparable in many instances, for example, where $R_F$ is $CF_3$, to the known polysiloxanes in which the $(CF_3)_2N.CH_2.CH_2-$ group is replaced by the $CF_3.CH_2.CH_2-$ group, and they also resist attack by acids and bases.

The silanes, polysilsesquioxanes and polysiloxanes of the present invention may be used thermally stable hydraulic fluids or as acid and/or base resistant thermally stable elastomers or sealants.

There will now be described by way of example only the production of three typical substituted silanes of Formula I above and the hydrolysis and condensation of such silanes to produce polymers of Formulas (IV) and (V) above.

In the following examples reactants and products were manipulated, where possible, in a conventional vacuum system to avoid contamination with air or moisture. Photochemical reactions were carried out at a distance of ca. 20 cm. from a Hanovia S.500 lamp. Products were separated either by repeated fractional distillation in vacuo or by preparative-scale gas-liquid chromatography (Perkin-Elmer 116, 154B, or 451 Fraktometers). The identities of products were established by molecular weight determination (Regnault's method), elemental analysis, infra-red spectroscopy (Perkin-Elmer 21 instrument with sodium chloride optics), nuclear magnetic resonance spectroscopy (Perkin-Elmer R10 spectrometer operating at 56.46 MHz for $19_F$ and 60.0 MHz for $1_H$, mass spectrometry (A.E.I. MS/2H instrument with a resolution of 1 in 700), and gas-liquid chromatography.

The NN-bistrifluoromethylvinylamine used in the following examples was prepared as described by Alexander, Haszeldine, Newlands and Tipping in J. Chem. Soc. (C) 1968, 796 and the NN-bistrifluoromethylprop-2-enylamine as described in Example 1.

In Examples 2, 3 and 4 the production of three substituted silanes as disclosed in formula (I) above is set forth; in Example 2, $R_F$ is $CF_3$, $m$ is 2, $n$ is 3 and X is chlorine; in Example 3, $R_F$ is $CF_3$, $m$ is 2, R is Me, $n$ is 2 and X is chlorine; and in Example 4, $R_F$ is $CF_3$ $m$ is 3, R is Me, $n$ is 2 and X is chlorine.

EXAMPLE 1

N-Bromobistrifluoromethylamine (3.00 g., 12.93 mmoles) and allyl chloride (1.20 g., 15.53 mmoles) were rapidly vaporized in vacuo into a Pyrex bulb (5 l.) and exposed to daylight for three hours. The volatile products were fractionated in vacuo to give (i) a mixture (3.22 g., 10.45 mmoles, 81 percent) (Found: C, 19.7; H, 1.7; N, 4.8. Calc. for $C_5H_5BrClF_6N$: C, 19.6; H, 1.6; N, 4.5 percent), b.p. 148°/750 mm. of 2-bromo-3-chloro-NN-bistrifluoromethylpropylamine (2.90 g., 9.40 mmoles, 73%) and 1-bromomethyl-2-chloro-NN-bistrifluoromethylethylamine (0.32 g., 1.05 mmoles, 8%), which could not be separated by distillation or by gas liquid chromatography and was identified by nuclear magnetic resonance spectroscopy, (ii) unchanged allyl chloride (0.18 g., 2.40 mmoles, 16% recovered), and (iii) a mixture (0.32g., 2.28 mmoles, 18%; M, 140) of NN-bistrifluoromethylamine and perfluoro(2-azapropene).

A mixture (3.30 g., 10.69 mmoles) of 2-bromo-3-chloro-NN-bistrifluoromethylpropylamine (2.97 g., 9.62 mmoles, 90%) and 1-bromomethyl-2-chloro-NN-bistrifluoromethylethylamine (0.33 g., 1.07 mmoles, 10%) (product (i) above) was slowly added during 30 minutes to a stirred suspension of activated zinc dust (6.0 g.) in refluxing ethanol (8 ml.) and the resulting mixture refluxed for one hour. The volatile products were collected in traps cooled to $-78°$, fractionated in vacuo and identified as propene (0.07 g., 1.67 mmoles, 16%) and NN-bistrifluoromethylprop-2-enylamine (1.40 g., 7.25 mmoles, 80% based on major reactant isomer) (Found: C, 31.2; H, 2.6; N, 7.1%; M, 190. $C_5H_5F_6N$ requires C, 31.1; H, 2.7; N, 7.2%; M, 193), b.p. 48°/750 mm. (Siwoloboff). infra-red spectral bands at 3.22w, 3.29w, 3.32w, 3.37w, 3.45w, 6.06w, 6.87m, 7.38vs, 7.54vs, 8.16vs, 8.48vs, 8.70w, 9.09w, 9.85m, 10.10s, 10.70m, 12.58m, 13.25m, 13.89s, 14.29s, and 15.38m$\mu$.

EXAMPLE 2

Method 1

A mixture of NN-bistrifluoromethylvinylamine (3.47 g., 19.4 mmoles) and trichlorosilane (3.94 g., 29.1 mmoles) was sealed in a silica ampoule (300 ml.) and irradiated during 40 hours while being shaken and gave (i) unchanged vinylamine (0.19 g., 1.4 mmoles, 7 percent recovered), (ii) unchanged trichloro-silane (1.43 g., 10.6 mmoles), and (iii) 2-NN-bistrifluoromethylaminoethyltrichlorosilane (5.65 g., 18.0 mmoles, 100%) (Found: C, 15.3; H, 1.6; N, 4.5%. $C_4H_4Cl_3F_6NSi$ requires C, 15.6; H, 1.3; N, 4.5%), b.p. 134° (isoteniscope); main infra-red spectral bands at 3.45w, 6.79w, 7.23s, 7.49s, 7.78s, 8.05w, 8.59s, 9.14m, 9.90w, 10.25m, 11.21m, 12.65m, 13.15w and 13.87m$\mu$.

Method 2

Dichloromethylsilane (22.80 g., 0.200 mole), NN-bistrifluoromethylvinylamine (25.10 g., 0.140 mole), and hexachloro-platinic acid (0.10 g.), sealed in a Pyrex ampoule (ca. 300 ml.), heated at 100° for 48 hours, and the products fractionated in vacuo, gave 2-(NN-bistrifluoromethylamino)ethyldichloromethylsilane (37.2 g., 0.127 mole, 97%), unchanged dichloromethylsilane (8.09 g., 0.071 mole, 35% recovered), and unchanged olefin (1.61 g., 9.00 mmoles, 6% recovered).

EXAMPLE 3

A mixture of NN-bistrifluoromethylvinylamine (4.40 g., 24.8 mmoles) and dichloromethylsilane (4.29 g., 37.3 mmoles) was sealed in a silica ampoule (300 ml.) and irradiated during 48 hours while being shaken and gave unchanged dichloromethylsilane (1.43 g., 12.4 mmoles, 33% recovered; M, 114) and 2-(NN-bistrifluoromethylamino)ethyldichloromethylsilane (7.29 g., 24.8 mmoles, 10%) (Found: C, 20.5; H, 2.5; N, 5.0; Cl, 23.9%. $C_5H_7Cl_2F_6NSi$ -requires C, 20.4; H, 2.4; N, 4.8; Cl, 24.1%), b.p. 142° (isoteniscope); main infra-red spectral bands at 3.40w, 3.45w, 6.79m, 7.25s, 7.54s, 7.78s, 7.90s, 8.70s, 9.19m, 9.35m, 9.90m, 10.27s, 11.18s, 12.11s, 12.30s, 12.65s, 13.30m, 13.72m, and 14.35m$\mu$.

EXAMPLE 4

Dichloromethylsilane (1.77 g., 15.54 mmoles), NN-Bistrifluoro-methylprop-2-enylamine. (1.50 g., 7.77 mmoles) and hexachloro-platinic acid (0.01 g.) were sealed in a Pyrex ampoule, heated at 80° for 24 hours and the products fractionated in vacuo, to give i. 3-(NN-bistrifluoromethylamino)propyldichloromethylsilane (2.03 g., 6.61 mmoles, 96%) (Found: C, 23.6; H, 3.1; N, 4.7. $C_6H_9Cl_2F_6NSi$ requires C, 23.5; H, 2.9; N, 4.6%), b.p. 163°/769 mm. (Siwoloboff), infra-red spectral bands at 3.36w, 3.38w, 3.44w, 3.47w, 6.83w, 7.25s, 7.54s, 8.03s, 8.70s, 9.17m, 9.52w, 9.90m, 10.20m, 10.64w, 10.99w, 11.14w, 12.09m, 12.30m, 12.62m, 13.33w, and 14.49m$\mu$, ii. unchanged dichloromethylsilane (1.02 g., 8.84 mmoles, 56 percent recovered), and iii. unchanged olefin (0.18 g., 0.92 mmole, 11 percent recovered).

EXAMPLE 5

This example describes the hydrolysis and condensation of the silane produced in Example 2 to give polysilsesquioxane, by three different methods.

Method 1

Water (2.0 g.) was added to 2-(NN-bistrifluoromethylamino)ethyltrichlorosilane (1.35 g., 4.3 mmoles) in diethyl ether (5 ml.) and the mixture refluxed during 1 hour. The ether and water were then removed in vacuo to give a viscous liquid (0.95 g., 4.1 mmoles, 95 percent yield calculated as polysilsesquioxane) the infra-red spectrum of which indicated the presence of a considerable amount of silanol (broad band at 3.0$\mu$). The liquid was then heated in vacuo as follows: 2 hr. at 100°; 2 hr. at 150°; 2 hr. at 200°; 2 hr. at 350°. An infra-red spectrum was run after each 2 hour period and only after the final 2 hr. at 350° were OH groups shown to be absent. The final product was a viscous liquid identified as poly-[2-(NN-bis-trifluoromethylamino) ethylsilsesquioxane](0.92 g., 4.0 mmoles, 92%) (Found: C, 20.6; H, 1.7; N, 5.9%, $C_4H_4ab6NO_{1.5}Si$ requires C, 20.7; H, 1.7; N, 6.0%).

Method 2

2-(NN-Bistrifluoromethylamino)ethyltrichlorosilane (2.80 g., 9.0 mmoles) was dissolved in toluene (10 ml.) and treated with hydrochloric acid (3% w/v, 10 ml.) and the mixture was refluxed during 5 hours. The toluene and water were removed in vacuo and the liquid product was heated in vacuo at 200° (4 hour) to give the polysilsesquioxane (1.90 g., 8.2 mmoles, 91%) the infra-red spectrum of which showed only a slight absorption at 3.0μ but which was otherwise spectroscopically identical with the material prepared by Method 1.

Method 3.

Water (3.0 g.) was added to 2-(NN-Bistrifluoromethylamino)ethyltrichlorosilane (6.23 g., 19.8 mmoles) in diethyl ether (10 ml.) and the mixture was refluxed during 1 hour. The ether was displaced by toluene and the water removed by azeotropic distillation with toluene. The resultant viscous liquid was treated with a 2:1 molar mixture of 2-ethylhexoic acid and 1,1,3,3-tetramethylguanidine dissolved in an equimolar weight of toluene (0.047 g.) and the mixture was refluxed (5.5 hours) using an azeotrope trap. The precipitated solid was washed several times with boiling toluene to remove any catalyst and the resultant product was then heated at 100° in vacuo (2 hr.) to give a crystalline solid (4.32 g., 18.6 mmoles, 94%) which, when purified by sublimation in vacuo, gave material (4.15 g., 17.8 mmoles 90%) (Found: C, 20.7; H, 2.0; N, 5.9; F, 48.8%; M, (by osmometry), 1425. Calc. for $C_{24}H_{24}F_{36}N_6O_9Si_6$: C, 20.7; H, 1.7; N, 6.0; F, 49.1% M, 1392);main infra red spectral bands at 6.78m, 7.23s, 7.50s, 7.76s, 8.40-9.20vs (broad), 9.91m, 10.27m, 11.17m, 12.36m, 12.83w and 14.42m (broad)μ possibly a cyclic hexamer (II).

The liquid polysilsesquioxane product by Methods 1 and 2 has considerable hydrolytic stability as is shown by its recovery unchanged from the following treatments (a) concentrated sulphuric acid at 100° (during 1 hour) (b) syrupy phosphoric acid at 160° during 1½ hours (c) methanol and aqueous hydrochloric acid under reflux during 4 hours (d) powdered, dry sodium hydroxide at 100° during one-half hour and (e) 2M aqueous sodium hydroxide at 100° during one-half hour.

The polysilsesquioxane was slightly charred by heating with concentrated sulphuric acid at 150°C during 1 hour.

EXAMPLE 6

This example describes the hydrolysis and condensation of the silane produced in Example 3 to give polysiloxanes by three methods. The third method results in cyclic trisiloxane.

Method 1

Diethyl ether (10 ml.) saturated with water was added to 2-(NN-bistrifluoromethylamino)ethyldichloromethylsilane (0.95 g., 3.23 mmoles) in diethyl ether (5 ml.) and the mixture was refluxed during 2 hours. The ether and water were removed by distillation and the liquid product was heated at 200° in vacuo during 2 hours, after which time infra-red examination showed that OH groups were absent. The resultant oil was identified as poly-[2-(NN-bis-trifluoromethylamino)ethylmethylsiloxane] (0.75 g., 3.1 mmoles 97%)(Found: C, 24.8; H, 2.9; N, 6.1%. $C_5H_7F_6NOSi$ requires C, 25.1; H, 2.9; N, 5.9%) main infra-red spectral bands at 3.33m, 3.39w, 4.60w, 4.75w, 6.44w, 6.77s, 7.00s, 7.22vs, 7.50vs, 7.76vs, 7.87vs, 8.30s, 8.70s, (broad), 9.25-9-50s (broad) (cyclic tetramer, higher cyclics, and linear polymer; Si-O-Si), 9.86vs (cyclic trimer ; Si-O-Si), 10.25s, 11.13s, 12.46s (broad) 13.08m, 14.80w and 14.43s μ.

Method 2

Diethyl ether (20 ml.) saturated with water was added to 2-(NN-bistrifluoromethylamino)ethyldichloromethysilane (7.24 g., 24.6 mmoles) in diethyl ether (20 ml.) and the mixture was refluxed during 2 hours. The ether was distilled off and the water was removed by azeotropic distillation with toluene. The excess toluene was then removed by distillation. The resultant polysiloxane (5.20 g., 21.4 mmoles, 87%) (Found: M, (by osmometry), 962.Calc. for $C_{20}H_{28}F_{24}N_4O_4Si_4$: M, 956) had an infra-red spectrum comparable to that of the material prepared by Method 1 (except for the presence of a very strong band at 9.28μ (cyclic tetramer; Si-O-Si) rather than the broad absorption at 9.25-9.50 μ) and was more mobile. When distilled in vacuo the polysiloxane could not be separated into trimer, tetramer etc. fractions.

Method 3

2-(NN-bistrifluoromethylamino)ethyldichloromethyl-silane (30.00 g., 0.101 mole) was slowly added (30 min.) to a stirred, aqueous solution of potassium hydroxide (4 M, 100 ml.) at a rate sufficient to maintain a temperature of 50°–60°. After the silane addition was completed, the mixture was stirred at 60° for two hours and the organic component was extracted with ether ( 2 × 50 ml.). The ethereal extract was dried ($MgSO_4$) and the ether removed to afford viscous poly-[2-(NN-bistrifluoromethylamino)-ethylmethylsiloxane] hydrolysate (19.60 g., 82%).

The crude hydrolysate (36.0 g.) was distilled from dry, powdered potassium hydroxide (0.36 g.) under reduced pressure (6.0 cm.) through an Ernst Haage spinning-band column (heated length 100 cm., internal diameter 6 mm.) with the column jacket maintained at ca. 15° below the boiling point of the fraction.

The following fractions were obtained.

i. A fraction (11.8 g., 33%), b.p. 100°–175°/6.0 cm. (mainly 100°–135°) considered to be a mixture of unidentified breakdown products containing a small amount of the cyclic trisiloxane with an infra-red spectral band at 9.75 μ).

ii. A fraction (19.8 g., 0.028 mole, 55%) (Found: C, 24.6; H, 3.2%; M, 705. $C_{15}H_{21}F_{18}N_3O_3Si_3$ requires C, 25.1; H, 2.9%; M, 717), b.p. ca. 175°/6.0 cm., which was identified as 1,3,5-trimethyl-1,3,5-tri-(3-NN-bis-trifluoromethylaminopropyl)cyclotrisiloxane, main infra-red spectral bands at 3.36m, 3.39w, 3.43m, 6.78m, 7.24vs, 7.52vs, 7.75vs, 7.88vs, 8.00m, 8.70vs, 9.19s and 9.75s, 10.17s, 10.70s, 10.75w, 11.20m, 11.41w, 12.45s, 13.11m, 13.90w and 14.42mμ.

iii. A viscous liquid (ca. 4g.), b.p. >175°/6.0 cm. remained in the still-pot.

The cyclotrisiloxane was shown by g.l.c. (2m. silicone SE30 column at 170°C) to be slightly impure and a pure sample (Found: C, 25.1; H, 3.1; N, 5.8; F, 47.7.$C_{15}H_{21}F_{18}N_3O_3Si_3$ requires C, 25.1; H, 2.9; H, 5.9; F, 47.7%) was separated by g.l.c.

EXAMPLE 7

This example described the polymerization of the cyclic trisiloxane obtained by Method 3 in Example 6.

1,3,5-Trimethyl-1,3,5-tri(3-NN-bis-trifluoromethylaminopropyl)-cyclotrisiloxane (5.00 g., 7.07 mmoles) was treated with dried, powdered potassium hydroxide (0.2 mole %) under a nitrogen atmosphere. The mixture was then heated at 150°C for 6 hours and yielded a polysiloxane (Found M, 3990. Calc. for $(C_5H_7F_6NOSi)_{16}$; M, 3956).

EXAMPLE 8

A stirred sample of pure 1,3,5-trimethyl-1,3,5-tri(3-NN-bistrifluoromethylaminopropyl)cyclotrisiloxane (0.30g.) was heated to 150°C in vacuo and anhydrous potassium hydroxide flour (0.003g) was added in vacuo. The mixture was kept at 150°C for 10 min., cooled, and traces of unreacted cyclotrisiloxane removed, to afford a polysiloxane (0.27g., 90%) as a slightly opaque gum of high molecular weight.

We claim:

1. As a composition of matter a polysilsesquioxane having the general formula:

$$\{(R_F)_2-N-CH_2-CH_2-SiO_{1.5}\}_x$$

where $R_F$ is a fully fluorinated lower alkyl group and $x$ is an integer with a value of 20 to 50.

2. A polysilsesquioxane as claimed in claim 1 wherein $R_F$ is trifluoromethyl.

3. As a composition of matter a polysiloxane having the general formula:

$$\{(R_F)_2N(CH_2)_mSiRO\}_y$$

wherein $R_F$ is a fully fluorinated lower alkyl group, R is a lower alkyl group, $m$ is two or three and $y$ has the value 3 to 16.

4. A polysiloxane as claimed in claim 3 wherein $R_F$ is trifluoromethyl.

5. A polysiloxane as claimed in claim 3 wherein R is methyl.

6. As a composition of matter a polysiloxane having the formula:

$$\{(CF_3)_2.N.(CH_2)_m.SiCH_3O\}_3$$

where $m$ is two or three.

* * * * *

UNITED STATES PATENT OFFICE
CERTIFICATE OF CORRECTION

Patent No. 3,720,644     Dated March 13, 1973

Inventor(s) Robert Neville HASZELDINE and Anthony Edgar TIPPING

It is certified that error appears in the above-identified patent and that said Letters Patent are hereby corrected as shown below:

Abstract, the first formula reading should read

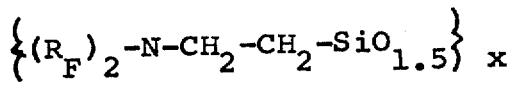

Abstract, the second formula reading

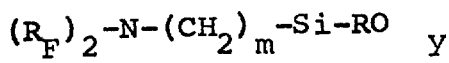

should read

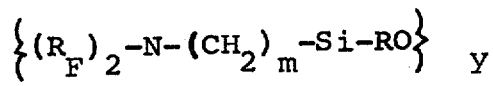

Signed and sealed this 26th day of March 1974.

(SEAL)
Attest:

EDWARD M. FLETCHER, JR.
Attesting Officer

C. MARSHALL DANN
Commissioner of Patents